United States Patent
Shi et al.

(10) Patent No.: US 9,971,336 B2
(45) Date of Patent: May 15, 2018

(54) PART HOLDING ASSEMBLY, AN ASSEMBLY SYSTEM AND A METHOD OF LOCATING AND SECURING A PART

(71) Applicant: GM GLOBAL TECHNOLOGY OPERATIONS LLC, Detroit, MI (US)

(72) Inventors: Jianying Shi, Oakland Township, MI (US); Scott A. McLeod, Windsor (CA); Justin Jay Hackett, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 150 days.

(21) Appl. No.: 14/830,305

(22) Filed: Aug. 19, 2015

(65) Prior Publication Data
US 2017/0050280 A1    Feb. 23, 2017

(51) Int. Cl.
*B23P 19/04*       (2006.01)
*G05B 19/19*       (2006.01)
*B25J 15/00*       (2006.01)

(52) U.S. Cl.
CPC ............ *G05B 19/19* (2013.01); *B25J 15/009* (2013.01); *B25J 15/0061* (2013.01)

(58) Field of Classification Search
CPC .... B25B 1/00; B25B 3/00; B25B 5/00; B25B 9/00
See application file for complete search history.

(56) References Cited

U.S. PATENT DOCUMENTS

| | | | |
|---|---|---|---|
| 4,589,184 A | 5/1986 | Asano et al. | |
| 4,631,815 A | 12/1986 | Bocchicchio et al. | |
| 5,066,936 A | 11/1991 | Hsu | |
| 5,608,847 A | 3/1997 | Pryor et al. | |
| 5,816,568 A * | 10/1998 | Fox | B25B 5/14 269/111 |

(Continued)

FOREIGN PATENT DOCUMENTS

| | | |
|---|---|---|
| CN | 2717610 Y | 8/2005 |
| CN | 201158031 Y | 12/2008 |

(Continued)

OTHER PUBLICATIONS

Goudsmit Magnetic Systems, brochure entitled "Magnet Grippers"; accessed Aug. 14, 2014; 4 pages.

(Continued)

*Primary Examiner* — Lee D Wilson
(74) *Attorney, Agent, or Firm* — Quinn IP Law

(57) ABSTRACT

An assembly system and a part holding assembly are configured to locate and secure a part defining a plurality of holes. The assembly includes a frame having a track. The assembly includes a first device and a second device each supported by the frame. One of the devices is movable along the track for positioning the devices relative to each other and relative to the location of the holes of the part. The first device includes a first pin and the second device includes a second pin. Each of the pins is movable between a closed position and an open position. The pins are configured to be disposed through respective holes of the part when in the closed position for locating the part. The pins are configured to expand in the respective holes when in the open position for securing the part to the devices.

18 Claims, 2 Drawing Sheets

(56) References Cited

U.S. PATENT DOCUMENTS

| | | | |
|---|---|---|---|
| 6,163,946 A | 12/2000 | Pryor et al. | |
| 6,367,788 B1 * | 4/2002 | Babchuk | B23K 37/0443 269/45 |
| 7,290,760 B1 * | 11/2007 | Lindsay | B25B 1/22 269/43 |
| 8,025,277 B2 | 9/2011 | Lin et al. | |
| 9,808,933 B2 | 11/2017 | Lin et al. | |
| 2008/0274865 A1 | 11/2008 | Sturm | |
| 2009/0193642 A1 | 8/2009 | Lin et al. | |
| 2009/0273130 A1 | 11/2009 | Armstrong et al. | |
| 2013/0106127 A1 | 5/2013 | Lipson et al. | |
| 2013/0298382 A1 | 11/2013 | Yamashita et al. | |
| 2014/0044237 A1 | 2/2014 | Ferrer et al. | |
| 2016/0052148 A1 | 2/2016 | Shi et al. | |
| 2017/0050280 A1 * | 2/2017 | Shi | G05B 19/19 |
| 2017/0050323 A1 | 2/2017 | Shi et al. | |

FOREIGN PATENT DOCUMENTS

| | | |
|---|---|---|
| CN | 101479437 A | 7/2009 |
| CN | 201544151 U | 8/2010 |
| CN | 102152162 A | 8/2011 |
| CN | 102267114 A | 12/2011 |
| CN | 102581632 A | 7/2012 |
| CN | 202622683 U | 12/2012 |
| CN | 203738183 U | 7/2014 |
| CN | 104668857 A | 6/2015 |
| CN | 104669016 A | 6/2015 |
| DE | 219721 A1 | 3/1985 |
| DE | 102009050119 A1 | 5/2010 |
| DE | 102014202257 A1 | 8/2014 |
| EP | 2732926 A1 | 5/2014 |
| JP | 2009-90442 A | 4/2009 |
| JP | 2010201517 A | 9/2010 |

OTHER PUBLICATIONS

Webpage entitled "Nitrogen Gas Springs" from the website: http://www.asraymond.com/nitrogen-springs.html; accessed on Jul. 29, 2015; 4 pages.

* cited by examiner

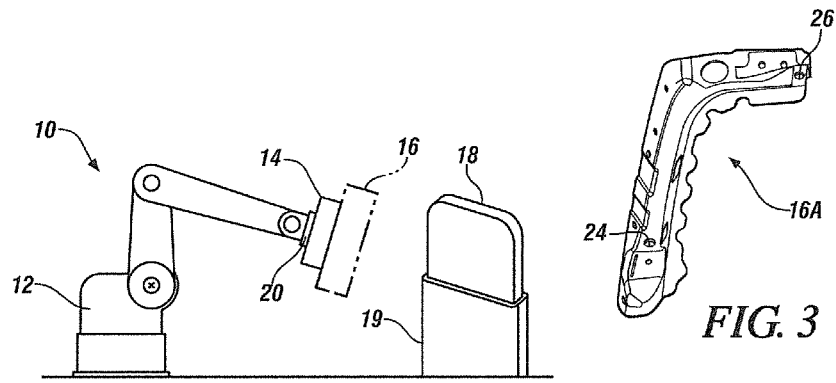
FIG. 1
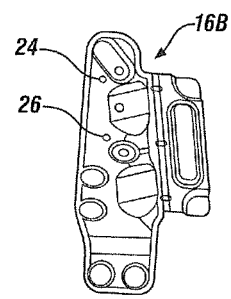
FIG. 3
FIG. 4
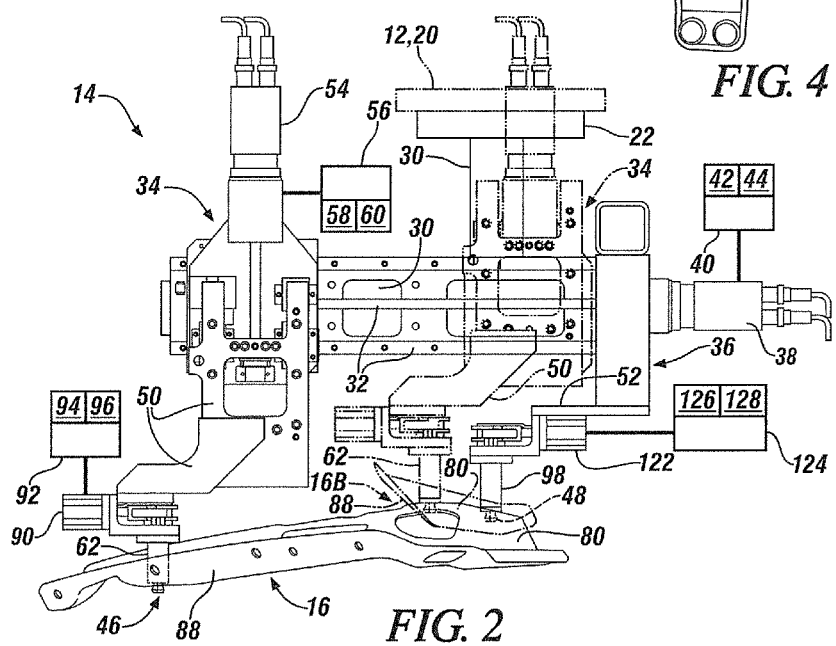
FIG. 2

PART HOLDING ASSEMBLY, AN ASSEMBLY SYSTEM AND A METHOD OF LOCATING AND SECURING A PART

TECHNICAL FIELD

The present disclosure relates to a part holding assembly configured to locate and secure a part defining a plurality of holes, an assembly system configured to locate and secure the part defining the holes and a method of locating and securing the part.

BACKGROUND

An assembled device comprises a multitude of structural components that are assembled to one another with sufficient precision for desired function and aesthetics. The assembled device includes multiple subassemblies each having a number of subcomponents. Typically, dedicated fixtures are designed for presenting and positioning each subcomponent relative to one or more other subcomponents to which the subcomponent is to be assembled. The dedicated fixtures are customized for a particular subcomponent and therefore have limited adjustability. These fixtures require an extended lead time and significant capital investment to design and manufacture prior to use in assembling the subcomponents. The assembled device can be a vehicle, home appliances, furniture, an aircraft, a watercraft, etc.

Generally, the holes through the various subcomponents are not standardized; therefore, separate individual dedicated grippers are utilized to move each different subcomponent. In other words, one dedicated gripper is utilized for one particular configuration of a subcomponent while another dedicated gripper is utilized for another particular configuration of another subcomponent. Therefore, specific grippers have to be designed for each particular subcomponent which requires lead time and capital investment. As such, the dedicated grippers have limited adjustability.

SUMMARY

The present disclosure provides a part holding assembly configured to locate and secure a part defining a plurality of holes. The part holding assembly includes a frame having a track. The part holding assembly also includes a first device and a second device each supported by the frame. One of the first and second devices is movable along the track for positioning the devices relative to each other and relative to the location of the holes of the part. The first device includes a first pin and the second device includes a second pin. Each of the first and second pins are movable between a closed position and an open position. The first and second pins are configured to be disposed through respective holes of the part when in the closed position for locating the part. Additionally, the first and second pins are configured to expand in the respective holes when in the open position for securing the part to the first and second devices.

The present disclosure also provides an assembly system configured to locate and secure a part defining a plurality of holes. The system includes a support structure having an attachment member and the system includes a part holding assembly coupled to the attachment member. The part holding assembly includes the features discussed in the paragraph immediately above.

The present disclosure further provides a method of locating and securing a part. The method includes positioning a part holding assembly relative to the part, with the part holding assembly including a frame, a first device including a first pin and a second device including a second pin. The method further includes moving one of the first and second devices to position the devices relative to each other and relative to the location of a first hole and a second hole respectively of the part. The method also includes inserting the first pin into the first hole of the part to locate the part and inserting the second pin into the second hole of the part to locate the part. Additionally, the method includes expanding the first and second pins after inserting the pins into the respective first and second holes to secure the part to the first and second devices.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic perspective view of an assembly system and a part holding assembly coupled to a support structure.

FIG. 2 is a schematic side view of the part holding assembly with a first device illustrated in solid lines in a first position and illustrated in phantom lines in a second position.

FIG. 3 is a schematic side view of one example of a part.

FIG. 4 is a schematic side view of another example of the part.

DETAILED DESCRIPTION

Figure 5:
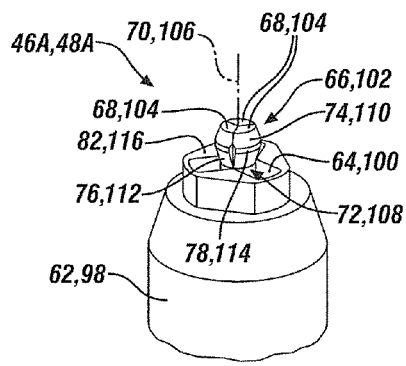
FIG. 5 is a schematic perspective view of a pin in a closed position.

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Referring to the Figures, wherein like numerals indicate like or corresponding parts throughout the several views, an assembly system 10 including a support structure 12 is generally shown in FIG. 1, with a part holding assembly 14 coupled to the support structure 12. Therefore, the assembly system 10 can include the part holding assembly 14.

The part holding assembly 14 is coupleable to the support structure 12. Therefore, the part holding assembly 14 can be removed from the support structure 12 when desired. The part holding assembly 14 can be utilized to position a part 16, which is referred to as a first part 16 for the below discussion, during assembly 14. The support structure 12 can be a stationary fixture, a frame, a robotic device, etc. When the support structure 12 is the robotic device (as shown in FIG. 1), the robotic device can utilize the part holding assembly 14 to locate and move the first part 16 to a desired location/orientation, details of which are discussed further below. Therefore, a controller can be in communication with the support structure 12 to position the part holding assembly 14 in a particular position relative to the first part 16. The part holding assembly 14 and the first part 16 are shown schematically in FIG. 1 to generally indicate the orientation of the components relative to the support structure 12. The details of the part holding assembly 14 is shown in FIG. 2 which are discussed further below.

Referring to FIG. 1, the part holding assembly 14 can be utilized to position the first part 16 relative to a base part 18 during assembly 14. Therefore, the assembly system 10 can include the first part 16, the base part 18, the support structure 12 and the part holding assembly 14. For example, the robotic device can position the base part 18 and another robotic device can pick up another part, such as the first part 16, and position that first part 16 relative to the base part 18. Meaning, one robotic device with one part holding assembly 14 can act as a fixture to support the base part 18 while another robotic device with another part holding assembly 14 can position the first part 16 relative to the base part 18. Alternatively, a stationary fixture 19 can be utilized to support the base part 18 and the robotic device with the part holding assembly 14 can position the first part 16 relative to the base part 18. In yet another alternative, the part holding assembly 14 can be secured to the stationary fixture 19 and the base part 18 placed on that part holding assembly 14, then the robotic device with another part holding assembly 14 can position the first part 16 relative to the base part 18. Generally, the part holding assembly 14 can accurately locate and hold in place the first part 16 for manufacturing and assembly 14 operations. For example, a single part, a subassembly/assembly of parts can be accurately located and held in place to assemble, weld and/or inspect various parts during the assembly process. The controller can be in communication with the support structure 12 to position the part holding assembly 14 in a particular position relative to the first part 16 and/or the base part 18. The controller can include a process and a memory as detailed below for the other controllers.

The first part 16 and the base part 18 can be any suitable configuration, and thus, are illustrated schematically in FIG. 1. Examples of different configurations of the first part 16 are shown in FIGS. 3 and 4. In certain embodiments, the first part 16 and the base part 18 can be components of a vehicle, such as body components or body panels, for cars, trucks, motorcycles, boats, aircrafts, farm equipment, etc. Alternatively, the first part 16 and the base part 18 can be for non-vehicles such as appliances, machines, farm equipment, etc. Non-limiting examples of the base part 18 are deck lids and lift gates of the vehicle. Non-limiting examples of the first part 16 of FIGS. 3 and 4 are reinforcement parts. For example, the reinforcement part of FIG. 3 can be utilized to reinforce a hinge of the lift gate, and the reinforcement part of FIG. 4 can be utilized to reinforce a hinge of the deck lid. The first part 16 can be any suitable material(s), and non-limiting examples can include steel, aluminum or composites.

The part holding assembly 14 can be utilized with many different configurations of the first part 16 and the base part 18 which can provide cost and time savings, as well as provide a range of adjustability. Therefore, the part holding assembly 14 described herein provides versatility to assemble many different parts.

Continuing with FIG. 1, the support structure 12 can include an attachment member 20. Generally, the part holding assembly 14 can be coupled to the attachment member 20. The attachment member 20 can be any suitable configuration to support the part holding assembly 14. For the robotic device embodiment, movement of the attachment member 20 correspondingly moves the part holding assembly 14.

Referring to FIG. 2, the part holding assembly 14 includes a platform 22 adapted to be coupled to the support structure 12. For example, the platform 22 can be secured to the robotic device such that during movement of the robotic device the part holding assembly 14 moves accordingly. In certain embodiments, the platform 22 is secured to the attachment member 20. The platform 22 can be secured to the attachment member 20 by any suitable methods, such as for example, one or more fasteners, clips, snaps, locks, tabs, etc.

The assembly system 10, and more specifically the part holding assembly 14, is configured to locate and secure the first part 16 defining a plurality of holes 24, 26. For example, as shown in FIGS. 3 and 4, the holes 24, 26 of the first part 16 can be defined as a first hole 24 and a second hole 26. The first and second holes 24, 26 can be in different locations depending on the configuration of the first part 16. When comparing FIGS. 3 and 4, two different first parts 16A, 16B are illustrated and the first and second holes 24, 26 of these different first parts 16A, 16B are in different locations. Generally, the holes 24, 26 are spaced from each other and can be any suitable configuration. The holes 24, 26 are utilized to locate the first part 16, but the holes 24, 26 are not holes that a fastener, a bolt, etc. are disposed through to secure the first part 16 to another part (such as the base part 18). In other words, the holes 24, 26 are only utilized for locating the first part 16. Therefore, the controller can be programmed to move the part holding assembly 14 to a particular position to locate the first part 16 via the holes 24, 26. Each of the holes 24, 26 are defined by a perimeter edge 28 of the first part 16, which will be discussed further below. It is to be appreciated that any suitable number of holes 24, 26 can be utilized.

Referring to FIG. 2, the part holding assembly 14 includes a frame 30. The platform 22 can be part of the frame 30. The frame 30 is coupleable to the attachment member 20, and more specifically, the platform 22 of the frame 30 is coupleable to the attachment member 20. The frame 30 can be removed from the attachment member 20 when desired. When the frame 30 is attached to the attachment member 20, the part holding assembly 14 moves in unison with the attachment member 20. Therefore, for the robotic device embodiment, movement of the attachment member 20 correspondingly moves the frame 30.

Continuing with FIG. 2, the frame 30 includes a track 32. Generally, the track 32 is spaced from the platform 22. The part holding assembly 14 further includes a first device 34 and a second device 36 each supported by the frame 30. One of the first and second devices 34, 36 is movable along the track 32 for positioning the devices 34, 36 relative to each other and relative to the location of the holes 24, 26 of the first part 16. In certain embodiments, the second device 36 is fixed to the frame 30, and the first device 34 is movable along the track 32 relative to the second device 36 such that a position of the first device 34 is changeable relative to the second device 36. In other embodiments, the first device 34 is fixed to the frame 30, and the second device 36 is movable along the track 32 relative to the first device 34 such that a position of the second device 36 is changeable relative to the first device 34.

For illustrative purposes only, the first device 34 is illustrated in a first position relative to the second device 36 in phantom lines in FIG. 2, and the first device 34 is illustrated in a second position relative to the second device 36 in solid lines in FIG. 2. FIG. 2 also illustrates two different sized first parts 16A, 16B (one in phantom lines and one in solid lines) that have different locations of the holes 24, 26, which further illustrates the versatility of the part holding assembly 14 having one of the devices 34, 36 movable relative to the other one of the devices 34, 36. When the first device 34 is movable, the first device 34 can move in a first direction and a second direction opposite the first direction. When the second device 36 is movable, the second device 36 can move in the first and second directions. In certain embodiments, the first device 34 moves substantially linearly between the first and second positions, and when the second device 36 is movable, the second device 36 moves substantially linearly between the first and second positions.

The first device 34 can include a first actuator 38 that selectively moves the first device 34 along the track 32. The first actuator 38 can be in communication with a first controller 40. The first controller 40 can control the first actuator 38 to selectively change the position of the first device 34 relative to the second device 36. Specifically, the first controller 40 determines the position that the first device 34 is to be located along the track 32, and signals the first actuator 38 to actuate which moves the first device 34 along the track 32. The first controller 40 can be part of an electronic control module. The first actuator 38 can be a pneumatic actuator, a hydraulic actuator, or any other suitable actuator.

The first controller 40 can include a processor 42 and a memory 44 on which is recorded instructions for controlling the first actuator 38. The first controller 40 can control other components not specifically discussed herein and/or be in electrical communication with another controller. The first controller 40 is configured to execute the instructions from the memory 44, via the processor 42. For example, the first controller 40 can be a host machine or distributed system, e.g., a computer such as a digital computer or microcomputer, and/or as a proportional-integral-derivative (PID) controller device having the processor 42, and, as the memory 44, tangible, non-transitory computer-readable memory such as read-only memory (ROM) or flash memory. The first controller 40 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the first controller 40 can include all software, hardware, memory 44, algorithms, connections, sensors, etc., necessary to control the first actuator 38. As such, a control method operative to control the first actuator 38 can be embodied as software or firmware associated with the first controller 40. It is to be appreciated that the first controller 40 can also include any device capable of analyzing data from various sensors, comparing data, making the necessary decisions required to control and monitor the first actuator 38.

When the second device 36 is movable along the track 32 instead of the first device 34, the second device 36 can include the first actuator 38 to selectively move the second device 36 along the track 32. Furthermore, when utilizing the first actuator 38 with the second device 36, the first actuator 38 can also include the first controller 40 and the features of the first controller 40 discussed above.

Referring to FIG. 2, the first device 34 includes a first pin 46 and the second device 36 includes a second pin 48. The first and second pins 46, 48 are utilized to locate the holes 24, 26 respectively. Each of the first and second pins 46, 48 is movable between a closed position (shown in FIGS. 5, 7 and 9) and an open position (shown in FIGS. 6 and 8). The first and second pins 46, 48 are configured to be disposed through respective holes 24, 26 of the first part 16 when in the closed position for locating the first part 16. For example, when in the closed position, the first pin 46 can be disposed through the first hole 24 of the first part 16 and the second pin 48 can be disposed through the second hole 26 of the first part 16. The first and second pins 46, 48 can move between the closed and open position simultaneously with each other, have partial overlapping movement with each other or move independently of each other, i.e., one moves before the other or one moves while the other remains stationary.

The first and second pins 46, 48 are configured to expand in the respective holes 24, 26 when in the open position for securing the first part 16 to the first and second devices 34, 36. Therefore, for example, when in the open position, the first pin 46 can expand in the first hole 24 of the first part 16 and the second pin 48 can expand in the second hole 26 of the first part 16. The first and second pins 46, 48 can be any suitable configuration and FIGS. 5-8 illustrate one suitable configuration of the pins 46A, 48A and FIG. 9 illustrates another suitable configuration of the pins 46B, 48B. Both of the pins 46, 48 can be substantially the same configuration or the pins 46, 48 can be different configurations. Therefore, for example, both of the pins 46, 48 can be in the configuration of FIGS. 5-8 or both of the pins 46, 48 can be in the configuration of FIG. 9. Alternatively, one of the pins 46, 48 can be in the configuration of FIGS. 5-8, and the other one of the pins 46, 48 can be in the configuration of FIG. 9.

Turning back to FIG. 2, the first device 34 can include a first arm 50 supporting the first pin 46. In certain embodiments, the first arm 50 can be movable transverse to the movement of the first device 34 along the track 32 such that a position of the first pin 46 is changeable relative to the track 32. For example, the first arm 50 is movable between a third position and a fourth position opposite the third position. The third and fourth positions are different from the first and second positions. FIG. 2 illustrates two different sized first parts 16 (one in phantom lines and one in solid lines) that have the first and second holes 24, 26 at different heights, which further illustrates the versatility of the part holding assembly 14 having the first arm 50 movable relative to the track 32 to accommodate different heights of the holes 24, 26 relative to each other.

The first arm 50 is movable substantially linearly between the third and fourth positions. The movement of the first arm 50 can be transverse to the movement of the first device 34. In one embodiment, the first arm 50 moves between the third and fourth positions substantially perpendicular to the movement of the first device 34 between the first and second positions. The first device 34 and the first arm 50 can move simultaneously with each other, have partial overlapping movement with each other or move independently of each other, i.e., one moves before the other or one moves while the other remains stationary. When the first device 34 is fixed to the frame 30 (instead of being movable), the first arm 50 can be fixed in a position relative to the frame 30.

Continuing with FIG. 2, the second device 36 can include a second arm 52 supporting the second pin 48. In certain embodiments, the second arm 52 can be fixed in a position relative to the frame 30. Therefore, the second pin 48 is movable relative to the second arm 52 between the closed and open positions, while the second arm 52 remains stationary.

Again, continuing with FIG. 2, the first device 34 can include a second actuator 54 that selectively moves the first arm 50 between the third and fourth directions. The second actuator 54 can be in communication with a second controller 56. The second controller 56 can control the second actuator 54 to selectively change the position of the first arm 50 relative to the first device 34. Specifically, the second controller 56 determines the position that the first arm 50 is to be located relative to the track 32 or the frame 30, and signals the second actuator 54 to actuate which moves the first arm 50. The second controller 56 can be part of an electronic control module. In certain embodiments, the second actuator 54 can be in communication with the first controller 40 such that the first controller 40 controls both the first and second actuators 38, 54, and therefore, the second controller 56 can be eliminated. The second actuator 54 can be a pneumatic actuator, a hydraulic actuator, or any other suitable actuator.

The second controller 56 can include a processor 58 and a memory 60 on which is recorded instructions for controlling the second actuator 54. The second controller 56 can control other components not specifically discussed herein and/or be in electrical communication with another controller or the first controller 40. The second controller 56 is configured to execute the instructions from the memory 60, via the processor 58. For example, the second controller 56 can be a host machine or distributed system, e.g., a computer such as a digital computer or microcomputer, and/or as a proportional-integral-derivative (PID) controller device having the processor 58, and, as the memory 60, tangible, non-transitory computer-readable memory such as read-only memory (ROM) or flash memory. The second controller 56 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the second controller 56 can include all software, hardware, memory 44, algorithms, connections, sensors, etc., necessary to control the second actuator 54. As such, a control method operative to control the second actuator 54 can be embodied as software or firmware associated with the second controller 56. It is to be appreciated that the second controller 56 can also include any device capable of analyzing data from various sensors, comparing data, making the necessary decisions required to control and monitor the second actuator 54.

When the second device 36 is movable along the track 32 instead of the first device 34, the second device 36 can include the second actuator 54 to selectively move the second arm 52 between the third and fourth positions. Furthermore, when utilizing the second actuator 54 with the second device 36, the second actuator 54 can also include the second controller 56 and the features of the second controller 56 discussed above.

Figure 6:
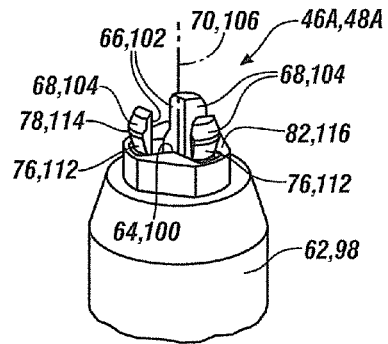
FIG. 6 is a schematic perspective view of the pin of FIG. 5 in an open position.
Figure 7:
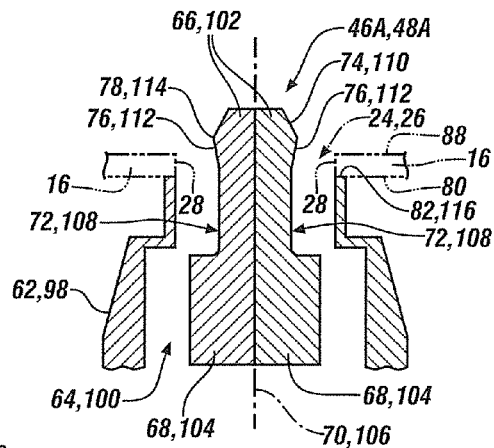
FIG. 7 is a schematic fragmentary cross-sectional view of the pin of FIG. 5 in the closed position, with the part shown in phantom lines.
Figure 8:
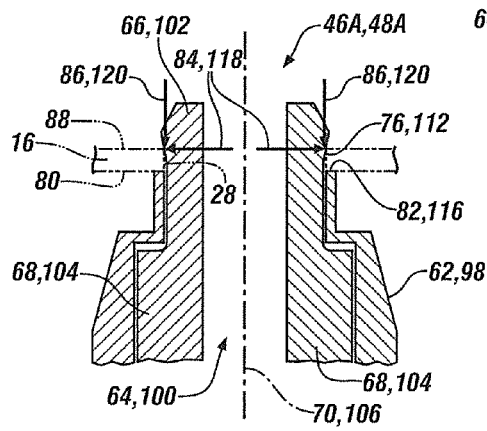
FIG. 8 is a schematic fragmentary cross-sectional view of the pin of FIG. 5 in the open position, with the part shown in phantom lines.
Figure 9:
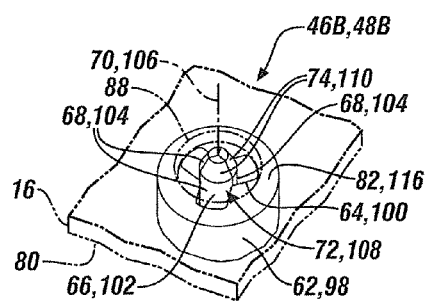
FIG. 9 is a schematic perspective view of a pin of another configuration in the closed position, with the part shown in phantom lines.

Turning to FIGS. 2-9, the first device 34 can include a first housing 62 supported by the first arm 50. The first housing 62 can define a first aperture 64 (best shown in FIGS. 7 and 8). The first pin 46 is disposed in the first aperture 64 and partially extends beyond the first housing 62 such that an end portion 66 of the first pin 46 is exposed outside of the first housing 62. The exposed portion of the first pin 46 can be inserted through the first hole 24 of the first part 16, which is best shown in FIGS. 7 and 8.

The first pin 46 can include a plurality of first fingers 68 (best shown in FIGS. 5-9). More specifically, in certain embodiments, the end portion 66 of the first pin 46 can include the first fingers 68. Generally, movement of the first fingers 68 is controlled. The first fingers 68 are disposed adjacent to each other when in the closed position such that the first fingers 68 are insertable into one of the holes 24, 26 of the first part 16 to locate the first part 16. Said differently, the first fingers 68 are disposed adjacent to each other when in the closed position such that the first fingers 68 are configured to be inserted into the one of the holes 24, 26 of the first part 16 to locate the first part 16. Optionally, the first fingers 68 can abut each other when in the closed position.

Furthermore, the first fingers 68 are disposed further from each other when in the open position than when in the closed position such that the first fingers 68 are movable away from each other to engage the first part 16 within the one of the holes 24, 26 of the first part 16 which secures the first part 16 to the first device 34. Said differently, the first fingers 68 are disposed further from each other when in the open position than when in the closed position such that the first fingers 68 are configured to move away from each other to engage the first part 16 within the one of the holes 24, 26 of the first part 16 which secures the first part 16 to the first device 34. Therefore, the first fingers 68 can be spaced from each other when in the open position and can engage the perimeter edge 28 when in the open position.

As best shown in FIGS. 7 and 8, the first aperture 64 is disposed along a first axis 70. The first fingers 68 are movable relative to the first axis 70 between the closed and open positions. Therefore, when the first fingers 68 are in the closed position, the first fingers 68 are disposed adjacent to the first axis 70, and when the first fingers 68 are in the open position, the first fingers 68 move outwardly away from the first axis 70.

The first fingers 68 are configured to cooperate with different types of material and different thicknesses of material that the first part 16 can be formed of. The first fingers 68 can have different configurations as best shown in FIGS. 5 and 9. Generally, the first fingers 68 of both embodiments can each include an outer surface 72 facing outwardly away from the first axis 70. The outer surface 72 of each of the first fingers 68 engages the first part 16 within the first hole 24 when in the open position to secure the first part 16 to the first device 34. More specifically, the outer surface 72 of the first fingers 68 can engage the perimeter edge 28 of the first part 16.

The outer surface 72 of the first fingers 68 can have different configurations to assist in securing the first part 16 to the first device 34. For example, the outer surface 72 of the first fingers 68 can have different tapers. It is to be appreciated that the outer surface 72 of the first fingers 68 can be other configurations than illustrated in the Figures. The configuration of the outer surface 72 of the first fingers 68 assists in securing the first part 16 to the first device 34 when the first pin 46 is in the open position. In certain embodiments, the outer surface 72 of each of the first fingers 68 can include a tapered portion 74. Both embodiments of FIGS. 5 and 9 illustrate the tapered portion 74. In certain embodiments, the tapered portion 74 of the first fingers 68 can angle outwardly away from the first axis 70. In one embodiment, the tapered portion 74 of the first fingers 68 can angle outwardly away from the first axis 70 toward the first housing 62. Therefore, the tapered portion 74 can increase in size as the tapered portion 74 angles toward the first housing 62.

The tapered portion 74 discussed immediately above can be referred to as a first tapered portion 74. The outer surface 72 of each of the first fingers 68 for the embodiment of FIG. 5 can further include a second tapered portion 76. In certain embodiments, the second tapered portion 76 of the first fingers 68 can angle outwardly away from the first axis 70. In one embodiment, the second tapered portion 76 of the first fingers 68 can angle outwardly away from the first axis 70 toward the first tapered portion 74. Therefore, the second tapered portion 76 can increase in size as the second tapered portion 76 angles toward the first tapered portion 74. Simply stated, the first and second tapered portions 74, 76 can meet at an apex 78 (as best shown in FIG. 7).

Referring to FIGS. 7-9, the end portion 66 of the first pin 46 can be inserted into the first hole 24 until a first surface 80 of the first part 16 abuts a rest 82 of the first housing 62. Once the first surface 80 rests against the rest 82, the first fingers 68 can be moved to the open position, which causes the outer surface 72 of the first fingers 68 to engage the perimeter edge 28 of the first part 16 in the first hole 24. Therefore, the first fingers 68 apply a first force 84 (identified as arrows 84 in FIG. 8) outwardly to the perimeter edge 28 of the first part 16 in the first hole 24 when in the open position. Generally, the first force 84 can be applied substantially perpendicular to the surface of the perimeter edge 28.

In the embodiment of FIG. 5, the second tapered portion 76 of the first fingers 68 engages the perimeter edge 28 of the first part 16 in the first hole 24 when in the open position. The configuration of the second tapered portion 76 of the first fingers 68 can also apply a second force 86 (identified as arrows 86 in FIG. 8) to the first part 16 when in the open position. Therefore, the first fingers 68 apply the second force 86 to a second surface 88 of the first part 16. The second surface 88 opposes the first surface 80. Generally, the second force 86 can be applied substantially perpendicular to the second surface 88 of the first part 16. As such, the first fingers 68 can clamp the first part 16 between the second tapered portion 76 and the rest 82.

In the embodiment of FIG. 9, the outer surface 72 of the first fingers 68, which is spaced from the first tapered portion 74, engages the perimeter edge 28 of the first part 16 when in the open position. Therefore, in the embodiment of FIG. 9, the first tapered portion 74 of the first fingers 68 does not engage the perimeter edge 28. In the embodiment of FIG. 9, the first force 84 is applied outwardly to the perimeter edge 28 of the first part 16 in the first hole 24 when in the open position, and the first force 84 can be applied substantially perpendicular to the surface of the perimeter edge 28 (the illustration of the arrows 84 of FIG. 8 also applies to the FIG. 9 embodiment). Additionally, the second force 86 is applied to the first part 16, but since this embodiment does not have the second tapered portion 76, the first fingers 68 do not clamp the first part 16, but instead, provide frictional engagement at the perimeter edge 28 to assist in holding the first part 16 to the first device 34. In the embodiment of FIG. 9, the second force 86 is applied substantially parallel to and at the perimeter edge 28 of the first hole 24 (the illustration of the arrows 86 of FIG. 8 also applies to the FIG. 9 embodiment).

The first device 34 can include a third actuator 90 (see FIG. 2) that selectively moves the first fingers 68 between the closed and open positions. The third actuator 90 can be in communication with a third controller 92. The third controller 92 can control the third actuator 90 to selectively change the position of the first fingers 68 relative to the first housing 62. Specifically, the third controller 92 determines whether the first fingers 68 are to be in the closed position or the open position, and signals the third actuator 90 to actuate which moves the first fingers 68. Additionally, the third controller 92 can determine the amount of force 84, 86 to apply to the first part 16 in the first hole 24 when the first fingers 68 are in the open position. Therefore, movement of the first fingers 68 is controlled.

The third controller 92 can be part of an electronic control module. In certain embodiments, the third actuator 90 can be in communication with the first controller 40 such that the first controller 40 controls the first, second and third actuators 38, 54, 90, and therefore, the third controller 92 can be eliminated. When utilizing the second controller 56, the third actuator 90 can be in communication with the first controller 40 or the second controller 56 such that either the first controller 40 controls the third actuator 90 or the second controller 56 controls the third actuator 90, and therefore, the third controller 92 can be eliminated. The third actuator 90 can be a pneumatic actuator, a hydraulic actuator, or any other suitable actuator.

The third controller 92 can include a processor 94 and a memory 96 on which is recorded instructions for controlling the third actuator 90. The third controller 92 can control other components not specifically discussed herein and/or be in electrical communication with another controller, the first controller 40 and/or the second controller 56. The third controller 92 is configured to execute the instructions from the memory 96, via the processor 94. For example, the third controller 92 can be a host machine or distributed system, e.g., a computer such as a digital computer or microcomputer, and/or as a proportional-integral-derivative (PID) controller device having the processor 94, and, as the memory 96, tangible, non-transitory computer-readable memory such as read-only memory (ROM) or flash memory. The third controller 92 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the third controller 92 can include all software, hardware, memory 96, algorithms, connections, sensors, etc., necessary to control the third actuator 90. As such, a control method operative to control the third actuator 90 can be embodied as software or firmware associated with the third controller 92. It is to be appreciated that the third controller 92 can also include any device capable of analyzing data from various sensors, comparing data, making the necessary decisions required to control and monitor the third actuator 90.

Turning to FIGS. 2-9, the second device 36 can include a second housing 98 supported by the second arm 52. The second housing 98 can define a second aperture 100 (best shown in FIGS. 7 and 8). The second pin 48 is disposed in the second aperture 100 and partially extending beyond the second housing 98 such that an end portion 102 of the second pin 48 is exposed outside of the second housing 98.

The exposed portion of the first pin 46 can be inserted through the second hole 26 of the first part 16, which is best shown in FIGS. 7 and 8.

The second pin 48 can include a plurality of second fingers 104 (best shown in FIGS. 5-9). More specifically, in certain embodiments, the end portion 102 of the second pin 48 can include the second fingers 104. Generally, movement of the second fingers 104 is controlled. The second fingers 104 are disposed adjacent to each other when in the closed position such that the second fingers 104 are insertable into another one of the holes 24, 26 of the first part 16 to locate the first part 16. Said differently, the second fingers 104 are disposed adjacent to each other when in the closed position such that the second fingers 104 are configured to be inserted into the another one of the holes 24, 26 of the first part 16 to locate the first part 16. Optionally, the second fingers 104 can abut each other when in the closed position.

Furthermore, the second fingers 104 are disposed further from each other when in the open position than when in the closed position such that the second fingers 104 are movable away from each other to engage the first part 16 within the another one of the holes 24, 26 of the first part 16 which secures the first part 16 to the second device 36. Said differently, the second fingers 104 are disposed further from each other when in the open position than when in the closed position such that the second fingers 104 are configured to move away from each other to engage the first part 16 within the another one of the holes 24, 26 of the first part 16 to secure the first part 16 to the second device 36. Therefore, the second fingers 104 can be spaced from each other when in the open position and can engage the perimeter edge 28 when in the open position.

As best shown in FIGS. 7 and 8, the second aperture 100 is disposed along a second axis 106. The second fingers 104 are movable relative to the second axis 106 between the closed and open positions. Therefore, when the second fingers 104 are in the closed position, the second fingers 104 are disposed adjacent to the second axis 106, and when the second fingers 104 are in the open position, the second fingers 104 move outwardly away from the second axis 106.

The second fingers 104 are configured to cooperate with different types of material and different thicknesses of material that the first part 16 can be formed of. The second fingers 104 can have different configurations as best shown in FIGS. 5 and 9. Generally, the second fingers 104 of both embodiments can each include an outer surface 108 facing outwardly away from the second axis 106. The outer surface 108 of each of the second fingers 104 engages the first part 16 within the second hole 26 when in the open position to secure the first part 16 to the second device 36. More specifically, the outer surface 108 of the second fingers 104 can engage the perimeter edge 28 of the first part 16.

The outer surface 108 of the second fingers 104 can have different configurations to assist in securing the first part 16 to the second device 36. For example, the outer surface 108 of the second fingers 104 can have different tapers. It is to be appreciated that the outer surface 108 of the second fingers 104 can be other configurations than illustrated in the Figures. The configuration of the outer surface 108 of the second fingers 104 assists in securing the first part 16 to the second device 36 when the second pin 48 is in the open position. In certain embodiments, the outer surface 108 of each of the second fingers 104 can include a tapered portion 110. Both embodiments of FIGS. 5 and 9 illustrate the tapered portion 110. In certain embodiments, the tapered portion 110 the second fingers 104 can angle outwardly away from the second axis 106. In one embodiment, the tapered portion 110 of the second fingers 104 can angle outwardly away from the second axis 106 toward the second housing 98. Therefore, the tapered portion 110 can increase in size as the tapered portion 110 angles toward the second housing 98.

The tapered portion 110 of the second fingers 104 discussed immediately above can be referred to as a first tapered portion 110. The outer surface 108 of each of the second fingers 104 for the embodiment of FIG. 5 can further include a second tapered portion 112. In certain embodiments, the second tapered portion 112 of the second fingers 104 can angle outwardly away from the second axis 106. In one embodiment, the second tapered portion 112 of the second fingers 104 can angle outwardly away from the second axis 106 toward the first tapered portion 110 of the second fingers 104. Therefore, the second tapered portion 112 can increase in size as the second tapered portion 112 angles toward the first tapered portion 110. Simply stated, the first and second tapered portions 110, 112 can meet at an apex 114 (as best shown in FIG. 7).

Referring to FIGS. 7-9, the end portion 102 of the second pin 48 can be inserted into the second hole 26 until the first surface 80 of the first part 16 abuts a rest 116 of the second housing 98. Once the first surface 80 rests against the rest 116, the second fingers 104 can be moved to the open position, which causes the outer surface 108 of the second fingers 104 to engage the perimeter edge 28 of the first part 16 in the second hole 26. Therefore, the second fingers 104 apply a first force 118 (identified as arrows 118 in FIG. 8) outwardly to the perimeter edge 28 of the first part 16 in the second hole 26 when in the open position. Generally, the first force 118 can be applied substantially perpendicular to the surface of the perimeter edge 28.

In the embodiment of FIG. 5, the second tapered portion 112 of the second fingers 104 engages the perimeter edge 28 of the first part 16 in the second hole 26 when in the open position. The configuration of the second tapered portion 112 of the second fingers 104 can also apply a second force 120 (identified as arrows 120 in FIG. 8) to the first part 16 when in the open position. Therefore, the second fingers 104 apply the second force 120 to the second surface 88 of the first part 16. As discussed above, the second surface 88 opposes the first surface 80. Generally, the second force 120 can be applied substantially perpendicular to the second surface 88 of the first part 16. As such, the second fingers 104 can clamp the first part 16 between the second tapered portion 112 and the rest 116.

In the embodiment of FIG. 9, the outer surface 108 of the second fingers 104, which is spaced from the first tapered portion 110, engages the perimeter edge 28 of the first part 16 when in the open position. Therefore, in the embodiment of FIG. 9, the first tapered portion 110 of the second fingers 104 does not engage the perimeter edge 28. In the embodiment of FIG. 9, the first force 118 is applied outwardly to the perimeter edge 28 of the first part 16 in the second hole 26 when in the open position, and the first force 118 can be applied substantially perpendicular to the surface of the perimeter edge 28 (the illustration of the arrows 118 of FIG. 8 also applies to the FIG. 9 embodiment). Additionally, the second force 120 is applied to the first part 16 but since this embodiment does not have the second tapered portion 112, the second fingers 104 do not clamp the first part 16, but instead, provide frictional engagement at the perimeter edge 28 to assist in holding the first part 16 to the second device 36. In the embodiment of FIG. 9, the second force 120 is applied substantially parallel to and at the perimeter edge 28 of the second hole 26 (the illustration of the arrows 120 of FIG. 8 also applies to the FIG. 9 embodiment).

The second device 36 can include a fourth actuator 122 (see FIG. 2) that selectively moves the second fingers 104 between the closed and open positions. The fourth actuator 122 can be in communication with a fourth controller 124. The fourth controller 124 can control the fourth actuator 122 to selectively change the position of the second fingers 104 relative to the second housing 98. Specifically, the fourth controller 124 determines whether the second fingers 104 are to be in the closed position or the open position, and signals the fourth actuator 122 to actuate which moves the second fingers 104. Additionally, the fourth controller 124 can determine the amount of force 118, 120 to apply to the first part 16 in the second hole 26 when the second fingers 104 are in the open position. Therefore, movement of the second fingers 104 is controlled.

The fourth controller 124 can be part of an electronic control module. In certain embodiments, the fourth actuator 122 can be in communication with the first controller 40 such that the first controller 40 controls the first, second, third and fourth actuators 38, 54, 90, 122, and therefore, the fourth controller 124 can be eliminated. When utilizing the second controller 56, the fourth actuator 122 can be in communication with the first controller 40 or the second controller 56 such that either the first controller 40 controls the fourth actuator 122 or the second controller 56 controls the fourth actuator 122, and therefore, the fourth controller 124 can be eliminated. Alternatively, when utilizing the third controller 92, the fourth actuator 122 can be in communication with the third controller 92 such that the third controller 92 controls the fourth actuator 122, and therefore, the fourth controller 124 can be eliminated. The fourth actuator 122 can be a pneumatic actuator, a hydraulic actuator, or any other suitable actuator.

The fourth controller 124 can include a processor 126 and a memory 128 on which is recorded instructions for controlling the fourth actuator 122. The fourth controller 124 can control other components not specifically discussed herein and/or be in electrical communication with another controller, the first controller 40, the second controller 56 and/or the third controller 92. The fourth controller 124 is configured to execute the instructions from the memory 128, via the processor 126. For example, the fourth controller 124 can be a host machine or distributed system, e.g., a computer such as a digital computer or microcomputer, and/or as a proportional-integral-derivative (PID) controller device having the processor 126, and, as the memory 128, tangible, non-transitory computer-readable memory such as read-only memory (ROM) or flash memory. The fourth controller 124 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the fourth controller 124 can include all software, hardware, memory 128, algorithms, connections, sensors, etc., necessary to control the fourth actuator 122. As such, a control method operative to control the fourth actuator 122 can be embodied as software or firmware associated with the fourth controller 124. It is to be appreciated that the fourth controller 124 can also include any device capable of analyzing data from various sensors, comparing data, making the necessary decisions required to control and monitor the fourth actuator 122.

The present disclosure also provides a method of locating and securing the first part 16. The method includes positioning the part holding assembly 14 relative to the first part 16. The part holding assembly 14 includes the features discussed above, some of which are the frame 30, the first device 34 including the first pin 46 and the second device 36 including the second pin 48.

The method further includes moving one of the first and second devices 34, 36 to position the devices 34, 36 relative to each other and relative to the location of the first hole 24 and the second hole 26 respectively of the first part 16. In certain embodiments, moving one of the first and second devices 34, 36 further includes moving the first device 34 along the track 32 of the frame 30 while the second device 36 remains stationary which changes a position of the first pin 46 relative to the second pin 48. Generally, moving the first device 34 occurs before inserting the first pin 46 into the first hole 24 of the first part 16.

The method also includes inserting the first pin 46 into the first hole 24 of the first part 16 to locate the first part 16, and inserting the second pin 48 into the second hole 26 of the first part 16 to locate the first part 16. In certain embodiments, moving the first device 34 occurs before inserting the first and second pins 46, 48 into the first and second holes 24, 26, respectively to locate the first part 16.

The method further includes expanding the first and second pins 46, 48 after inserting the pins 46, 48 into the respective first and second holes 24, 26 to secure the first part 16 to the first and second devices 34, 36. Expanding the pins 46, 48 can include moving the first fingers 68 outwardly toward the perimeter edge 28 of the first hole 24, and moving the second fingers 104 outwardly toward the perimeter edge 28 of the second hole 26. Once the pins 46, 48 are expanded to secure the first part 16 to the part holding assembly 14, the first part 16 can be moved to position the first part 16 relative to the base part 18. Then a subsequent operation can occur, such as, welding or fastening the first part 16 to the base part 18.

The method can include other features not specifically identified in the method discussion. Therefore, the method can include other features disclosed herein.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A part holding assembly configured to locate and secure a part defining a plurality of holes, the assembly comprising:
    a frame including a track;
    a first device and a second device each supported by the frame; wherein one of the first and second devices is movable along the track for positioning the devices relative to each other and relative to the location of the holes of the part; and wherein the first device includes a first pin and the second device includes a second pin, with each of the first and second pins being movable between a closed position and an open position, and wherein the first and second pins are configured to be disposed through respective holes of the part when in the closed position for locating the part, and the first and second pins are configured to expand in the respective holes when in the open position for securing the part to the first and second devices;

wherein the first pin includes a plurality of first fingers movable toward each other to insert the first fingers into one of the holes and movable away from each other to engage the part within the one of the holes.

2. The assembly as set forth in claim 1 wherein the second device is fixed to the frame, and the first device is movable along the track relative to the second device such that a position of the first device is changeable relative to the second device.

3. The assembly as set forth in claim 2 wherein the first device includes a first arm supporting the first pin, and wherein the first arm is movable transverse to the movement of the first device along the track such that a position of the first pin is changeable relative to the track.

4. The assembly as set forth in claim 3 wherein the first device includes a first housing supported by the first arm and defining a first aperture, with the first pin disposed in the first aperture and partially extending beyond the first housing such that an end portion of the first pin is exposed outside of the first housing.

5. The assembly as set forth in claim 4 wherein the end portion of the first pin includes the plurality of first fingers, with the first fingers disposed adjacent to each other when in the closed position such that the first fingers are configured to be inserted into one of the holes of the part to locate the part, and the first fingers are disposed further from each other when in the open position than when in the closed position such that the first fingers are configured to move away from each other to engage the part within the one of the holes of the part which secures the part to the first device.

6. The assembly as set forth in claim 5 wherein the first aperture is disposed along a first axis, and the first fingers are movable relative to the first axis between the closed and open positions, with the first fingers each including an outer surface facing outwardly away from the first axis, and the outer surface of each of the first fingers include a tapered portion.

7. The assembly as set forth in claim 2 wherein the second device includes a second arm supporting the second pin, with the second arm fixed in a position relative to the frame, with the second pin movable relative to the second arm between the closed and open positions.

8. The assembly as set forth in claim 7 wherein the second device includes a second housing supported by the second arm and defining a second aperture, with the second pin disposed in the second aperture and partially extending beyond the second housing such that an end portion of the second pin is exposed outside of the second housing.

9. The assembly as set forth in claim 8 wherein the end portion of the second pin includes a plurality of second fingers, with the second fingers disposed adjacent to each other when in the closed position such that the second fingers are configured to be inserted into one of the holes of the part to locate the part, and the second fingers are disposed further from each other when in the open position than when in the closed position such that the second fingers are configured to move away from each other to engage the part within the one of the holes of the part to secure the part to the second device.

10. The assembly as set forth in claim 9 wherein the second aperture is disposed along a second axis, and the second fingers are movable relative to the second axis between the closed and open positions, with the second fingers each including an outer surface facing outwardly away from the second axis, and the outer surface of each of the second fingers include a tapered portion.

11. The assembly as set forth in claim 1 wherein the first pin includes the plurality of first fingers disposed adjacent to each other when in the closed position such that the first fingers are insertable into one of the holes of the part to locate the part, and the first fingers are disposed further from each other when in the open position than when in the closed position such that the first fingers are movable away from each other to engage the part within the one of the holes of the part which secures the part to the first device, and wherein the second pin includes a plurality of second fingers disposed adjacent to each other when in the closed position such that the second fingers are insertable into another one of the holes of the part to locate the part, and the second fingers are disposed further from each other when in the open position than when in the closed position such that the second fingers are movable away from each other to engage the part within the another one of the holes of the part which secures the part to the second device; and wherein the movement of the first and second fingers is controlled.

12. An assembly system configured to locate and secure a part defining a plurality of holes, the system comprising:
a support structure including an attachment member;
a part holding assembly coupled to the attachment member, the assembly including:
a frame including a track;
a first device and a second device each supported by the frame; wherein one of the first and second devices is movable along the track for positioning the devices relative to each other and relative to the location of the holes of the part; and
wherein the first device includes a first pin and the second device includes a second pin, with each of the first and second pins being movable between a closed position and an open position, and wherein the first and second pins are configured to be disposed through respective holes of the part when in the closed position for locating the part, and the first and second pins are configured to expand in the respective holes when in the open position for securing the part to the first and second devices;
wherein the first pin includes a plurality of first fingers disposed adjacent to each other when in the closed position such that the first fingers are insertable into one of the holes of the part to locate the part, and the first fingers are disposed further from each other when in the open position than when in the closed position such that the first fingers are movable away from each other to engage the part within the one of the holes of the part which secures the part to the first device; and
wherein the second pin includes a plurality of second fingers disposed adjacent to each other when in the closed position such that the second fingers are insertable into another one of the holes of the part to locate the part, and the second fingers are disposed further from each other when in the open position than when in the closed position such that the second fingers are movable away from each other to engage the part within the another one of the holes of the part which secures the part to the second device.

13. The system as set forth in claim 12 wherein the second device is fixed to the frame, and the first device is movable along the track relative to the second device such that a position of the first device is changeable relative to the second device.

14. The system as set forth in claim 12 wherein the first device includes a first arm supporting the first pin, and wherein the first arm is movable transverse to the movement of the first device along the track such that a position of the first pin is changeable relative to the track.

15. The system as set forth in claim 13 wherein the second device includes a second arm supporting the second pin, with the second arm fixed in a position relative to the frame, with the second pin movable relative to the second arm between the closed and open positions.

16. A method of locating and securing a part, the method comprising:
   positioning a part holding assembly relative to the part, with the part holding assembly including a frame, a first device including a first pin and a second device including a second pin;
   wherein the frame includes a track, and the frame supports the first and second devices;
   wherein each of the first and second pins are movable between a closed position and an open position;
   moving one of the first and second devices along the track to position the devices relative to each other and relative to the location of a first hole and a second hole respectively of the part;
   inserting the first pin into the first hole of the part to locate the part;
   inserting the second pin into the second hole of the part to locate the part; and
   expanding the first and second pins after inserting the pins into the respective first and second holes to secure the part to the first and second devices;
   wherein the first pin includes a plurality of first fingers;
   wherein inserting the first pin into the first hole includes inserting the first fingers into the first hole;
   moving the first fingers away from each other to engage the part within the first hole.

17. The method as set forth in claim 16 wherein moving one of the first and second devices further comprises moving the first device along the track of the frame while the second device remains stationary which changes a position of the first pin relative to the second pin, and wherein moving the first device occurs before inserting the first pin into the first hole of the part.

18. The method as set forth in claim 17 wherein moving the first device occurs before inserting the first and second pins into the first and second holes, respectively to locate the part.

* * * * *